United States Patent
Anand et al.

(10) Patent No.: US 10,616,143 B2
(45) Date of Patent: *Apr. 7, 2020

(54) METHODS AND APPARATUS FOR FLOW CONTROL ASSOCIATED WITH A SWITCH FABRIC

(71) Applicant: Juniper Networks, Inc., Sunnyvale, CA (US)

(72) Inventors: Prashant Anand, Noida (IN); Gunes Aybay, Cupertino, CA (US); Arijit Sarcar, San Jose, CA (US); Hardik Bhalala, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 15/601,519

(22) Filed: May 22, 2017

(65) Prior Publication Data
US 2017/0257328 A1  Sep. 7, 2017

Related U.S. Application Data

(63) Continuation of application No. 12/957,472, filed on Dec. 1, 2010, now Pat. No. 9,660,940.

(51) Int. Cl.
*H04L 12/931* (2013.01)
*H04L 12/933* (2013.01)
(Continued)

(52) U.S. Cl.
CPC ............ *H04L 49/506* (2013.01); *H04L 47/29* (2013.01); *H04L 49/1515* (2013.01); *H04L 49/254* (2013.01)

(58) Field of Classification Search
CPC ... H04L 47/29; H04L 49/1515; H04L 49/254; H04L 49/506
See application file for complete search history.

(56) References Cited

U.S. PATENT DOCUMENTS

| 5,457,687 A | 10/1995 | Newman |
| 5,506,839 A | 4/1996 | Hatta |

(Continued)

FOREIGN PATENT DOCUMENTS

| CN | 1278696 | | 1/2001 |
| CN | 1868180 | A | 11/2006 |

(Continued)

OTHER PUBLICATIONS

European Search Report for European Application No. EP 11 18 8568, dated Jun. 20, 2012.

(Continued)

*Primary Examiner* — Marcus Smith
(74) *Attorney, Agent, or Firm* — Cooley LLP

(57) ABSTRACT

In some embodiments, an apparatus includes a flow control module configured to receive a first data packet from an output queue of a stage of a multi-stage switch at a first rate when an available capacity of the output queue crosses a first threshold. The flow control module is configured to receive a second data packet from the output queue of the stage of the multi-stage switch at a second rate when the available capacity of the output queue crosses a second threshold. The flow control module configured to send a flow control signal to an edge device of the multi-stage switch from which the first data packet or the second data packet entered the multi-stage switch.

20 Claims, 7 Drawing Sheets

(51) Int. Cl.
*H04L 12/937* (2013.01)
*H04L 12/801* (2013.01)

(56) References Cited

U.S. PATENT DOCUMENTS

| | | |
|---|---|---|
| 5,926,473 A | 7/1999 | Gridley |
| 5,987,008 A | 11/1999 | Simpson et al. |
| 5,987,028 A | 11/1999 | Yang et al. |
| 5,991,295 A | 11/1999 | Tout et al. |
| 6,049,546 A | 4/2000 | Ramakrishnan |
| 6,073,089 A | 6/2000 | Baker et al. |
| 6,324,165 B1 | 11/2001 | Fan et al. |
| 6,370,145 B1 | 4/2002 | Dally et al. |
| 6,438,107 B1 | 8/2002 | Somiya et al. |
| 6,512,747 B1 | 1/2003 | Umeuchi et al. |
| 6,618,357 B1 | 9/2003 | Geyer et al. |
| 6,621,828 B1 | 9/2003 | Field et al. |
| 6,657,962 B1 | 12/2003 | Barri et al. |
| 6,856,622 B1 | 2/2005 | Calamvokis et al. |
| 6,944,173 B1 | 9/2005 | Jones et al. |
| 6,973,032 B1 | 12/2005 | Casley et al. |
| 6,977,932 B1 | 12/2005 | Hauck |
| 6,986,161 B2 | 1/2006 | Billhartz |
| 7,027,457 B1 | 4/2006 | Chiussi et al. |
| 7,042,842 B2 | 5/2006 | Paul et al. |
| 7,046,631 B1 | 5/2006 | Giroux et al. |
| 7,061,862 B2 | 6/2006 | Horiguchi et al. |
| 7,075,934 B2 | 7/2006 | Chiussi et al. |
| 7,085,846 B2 | 8/2006 | Jenne et al. |
| 7,173,931 B2 | 2/2007 | Chao et al. |
| 7,180,857 B2 | 2/2007 | Kawakami et al. |
| 7,185,368 B2 | 2/2007 | Copeland, III |
| 7,230,947 B1 | 6/2007 | Huber et al. |
| 7,233,568 B2 | 6/2007 | Goodman et al. |
| 7,234,168 B2 | 6/2007 | Gupta et al. |
| 7,269,666 B1 | 9/2007 | Leitner et al. |
| 7,277,429 B2 | 10/2007 | Norman et al. |
| 7,283,471 B2 | 10/2007 | Gutierrez et al. |
| 7,324,442 B1 | 1/2008 | Pan et al. |
| 7,327,680 B1 | 2/2008 | Kloth |
| 7,372,813 B1 | 5/2008 | Cimino et al. |
| 7,391,736 B2 | 6/2008 | Na et al. |
| 7,403,524 B2 | 7/2008 | Hill |
| 7,424,744 B1 | 9/2008 | Wu et al. |
| 7,430,175 B2 | 9/2008 | Dropps et al. |
| 7,440,448 B1 | 10/2008 | Lu et al. |
| 7,457,245 B2 | 11/2008 | McAlpine et al. |
| 7,519,860 B2 | 4/2009 | Hatonen et al. |
| 7,540,025 B2 | 5/2009 | Tzadikario |
| 7,543,052 B1 | 6/2009 | Cesa Klein |
| 7,564,869 B2 | 7/2009 | Cafiero et al. |
| 7,643,418 B1 | 1/2010 | Varier et al. |
| 7,701,849 B1 | 4/2010 | Ma |
| 7,719,982 B2 | 5/2010 | Varma |
| 8,154,996 B2 | 4/2012 | Godbole et al. |
| 8,160,072 B1 | 4/2012 | Gnanasekaran et al. |
| 8,213,308 B2 | 7/2012 | Godbole et al. |
| 8,218,442 B2 | 7/2012 | Godbole et al. |
| 8,228,797 B1 | 7/2012 | Utley et al. |
| 8,254,255 B2 | 8/2012 | Thomas |
| 8,553,710 B1 | 10/2013 | Thomas |
| 8,717,889 B2 | 5/2014 | Thomas |
| 8,724,628 B1 | 5/2014 | Aybay |
| 9,660,940 B2 | 5/2017 | Anand |
| 2001/0021174 A1 | 9/2001 | Luijten et al. |
| 2002/0057699 A1 | 5/2002 | Roberts |
| 2002/0064170 A1 | 5/2002 | Siu et al. |
| 2002/0075883 A1 | 6/2002 | Dell et al. |
| 2002/0080789 A1 | 6/2002 | Henderson et al. |
| 2002/0118692 A1 | 8/2002 | Oberman et al. |
| 2002/0154637 A1 | 10/2002 | Keller-Tuberg |
| 2002/0167950 A1 | 11/2002 | Chang et al. |
| 2003/0005145 A1 | 1/2003 | Bullard |
| 2003/0023733 A1 | 1/2003 | Lingafelt et al. |
| 2003/0026267 A1 | 2/2003 | Oberman et al. |
| 2003/0026287 A1 | 2/2003 | Mullendore et al. |
| 2003/0035432 A1 | 2/2003 | Sreejith et al. |
| 2003/0058880 A1 | 3/2003 | Sarkinen |
| 2003/0063348 A1 | 4/2003 | Posey |
| 2003/0126280 A1* | 7/2003 | Yao .................. H04L 47/10 709/234 |
| 2003/0218977 A1 | 11/2003 | Pan et al. |
| 2004/0001433 A1 | 1/2004 | Gram et al. |
| 2004/0013124 A1 | 1/2004 | Peebles et al. |
| 2004/0165598 A1 | 8/2004 | Shrimali et al. |
| 2005/0036502 A1 | 2/2005 | Blanc et al. |
| 2005/0108444 A1 | 5/2005 | Flauaus |
| 2005/0111460 A1 | 5/2005 | Sahita |
| 2005/0138238 A1 | 6/2005 | Tierney et al. |
| 2005/0138243 A1 | 6/2005 | Tierney et al. |
| 2005/0210533 A1 | 9/2005 | Copeland et al. |
| 2005/0226156 A1 | 10/2005 | Keating et al. |
| 2005/0249214 A1 | 11/2005 | Peng |
| 2005/0276263 A1 | 12/2005 | Suetsugu et al. |
| 2006/0067225 A1 | 3/2006 | Fedorkow et al. |
| 2006/0104298 A1 | 5/2006 | McAlpine et al. |
| 2006/0120289 A1 | 6/2006 | Cunningham |
| 2006/0123480 A1 | 6/2006 | Oh et al. |
| 2006/0146703 A1 | 7/2006 | Cha et al. |
| 2006/0272018 A1 | 11/2006 | Fouant |
| 2006/0285548 A1 | 12/2006 | Hill et al. |
| 2007/0016666 A1 | 1/2007 | Duffield et al. |
| 2007/0064617 A1 | 3/2007 | Reves |
| 2007/0067438 A1 | 3/2007 | Goranson et al. |
| 2007/0086464 A1 | 4/2007 | Somashekhar |
| 2007/0094729 A1 | 4/2007 | Hoefelmeyer et al. |
| 2007/0118909 A1 | 5/2007 | Hertzog et al. |
| 2007/0150949 A1 | 6/2007 | Futamura et al. |
| 2007/0180526 A1 | 8/2007 | Copeland, III |
| 2007/0192861 A1 | 8/2007 | Varghese et al. |
| 2007/0240207 A1 | 10/2007 | Belakhdar et al. |
| 2007/0268830 A1 | 11/2007 | Li et al. |
| 2008/0028096 A1 | 1/2008 | Henderson |
| 2008/0028467 A1 | 1/2008 | Kornmareddy et al. |
| 2008/0062876 A1 | 3/2008 | Giroux et al. |
| 2008/0080548 A1 | 4/2008 | Mullendore et al. |
| 2008/0082977 A1 | 4/2008 | Araujo et al. |
| 2008/0137534 A1 | 6/2008 | Chilukoor et al. |
| 2008/0151863 A1 | 6/2008 | Lawrence et al. |
| 2008/0198746 A1 | 8/2008 | Kwan et al. |
| 2008/0253289 A1 | 10/2008 | Naven et al. |
| 2008/0259798 A1 | 10/2008 | Loh et al. |
| 2008/0263661 A1 | 10/2008 | Bouzida |
| 2008/0285449 A1 | 11/2008 | Larsson et al. |
| 2009/0003212 A1 | 1/2009 | Kwan et al. |
| 2000/0077663 | 3/2009 | Sun et al. |
| 2009/0268614 A1 | 10/2009 | Tay et al. |
| 2009/0300209 A1 | 12/2009 | Elzur |
| 2010/0061238 A1 | 3/2010 | Godbole et al. |
| 2010/0061239 A1 | 3/2010 | Godbole et al. |
| 2010/0061390 A1 | 3/2010 | Godhole et al. |
| 2010/0085891 A1 | 4/2010 | Kind et al. |
| 2010/0097934 A1 | 4/2010 | Hendel et al. |
| 2010/0158031 A1 | 6/2010 | Thomas et al. |
| 2010/0165843 A1 | 7/2010 | Thomas |
| 2010/0172264 A1 | 7/2010 | Jones |
| 2011/0154132 A1 | 6/2011 | Aybay |
| 2011/0158248 A1 | 6/2011 | Vorunganti et al. |
| 2011/0267942 A1 | 11/2011 | Aybay et al. |
| 2011/0310739 A1 | 12/2011 | Aybay et al. |
| 2012/0134260 A1 | 5/2012 | Chou et al. |
| 2012/0195203 A1 | 8/2012 | Godbole et al. |
| 2012/0233349 A1 | 9/2012 | Aybay et al. |
| 2012/0269065 A1 | 10/2012 | Godbole et al. |
| 2012/0275307 A1 | 11/2012 | Godbole et al. |

FOREIGN PATENT DOCUMENTS

| | | |
|---|---|---|
| CN | 101199168 A | 6/2008 |
| EP | 1133110 A2 | 9/2001 |
| EP | 1653685 A1 | 5/2006 |
| EP | 1892905 A1 | 2/2008 |
| EP | 2040420 A1 | 3/2009 |
| EP | 2180644 A1 | 4/2010 |

(56) References Cited

FOREIGN PATENT DOCUMENTS

| EP | 2461529 A2 | 6/2012 |
|----|------------|--------|
| GB | 2361139 A | 10/2001 |
| WO | WO 1994/014266 | 6/1994 |
| WO | WO1997004546 A1 | 2/1997 |

OTHER PUBLICATIONS

F.K. Liotopoulos et al., "A Modular, 160 Gbps ATM Switch Architecture for Multimedia Networking Support, based on a 3-Stage Clos Network," Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.
William J. Dally, "Virtual-Channel Flow Control," IEEE Transactions on Parallel and Distributed Systems, vol. 3, No. 2, Mar. 1992, pp. 194-205.
Mohammad Alizadeh et al. "Data Center TCP (DCTCP)" SIGCOMM'10, Aug. 30-Sep. 3, 2010, New Delhi, India, Copyright 2010 ACM 978-1-4503-0201—Feb. 10, 2008 (12 pages).
Cyriel Minkenberg et al. "Adaptive Routing for Convergence Enhanced Ethernet," In Proc Int Conf on High Performance Switching and Routing (HPSR) pp. 1-8, Jun. 22-24, 2009.
Office Action dated Apr. 29, 2010 for U.S. Appl. No. 12/343,728 (21 pages).
Office Action dated Oct. 15, 2010 for U.S. Appl. No. 12/343,728 (22 pages).
Office Action dated May 2, 2011 for U.S. Appl. No. 12/343,728 (22 pgs).
Final Office Action dated Oct. 7, 2011 for U.S. Appl. No. 12/343,728 (25 pgs).
Office Action dated Mar. 26, 2010 for U.S. Appl. No. 12/242,224 (17 pages).
Office Action dated Sep. 17, 2010 for U.S. Appl. No. 12/242,224 (9 pages).
Office Action dated Aug. 9, 2011 for U.S. Appl. No. 12/242,224 (7 pages).
Office Action dated Mar. 29, 2010 for U.S. Appl. No. 12/242,230 (11 pages).
Office Action dated Sep. 17, 2010 for U.S. Appl. No. 12/242,230 (16 pages).
Office Action dated Mar. 17, 2011 for U.S. Appl. No. 12/242,230 (11 pages).
Office Action dated Oct. 6, 2011 for U.S. Appl. No. 12/242,230 (19 pages).
Office Action dated May 23, 2011 for U.S. Appl. No. 12/558,118 (6 pgs).
Office Action dated May 11, 2010 for U.S. Appl. No. 12/345,490 (12 pages).
Office Action dated Oct. 15, 2010 for U.S. Appl. No. 12/345,490 (14 pages).
Office Action dated Apr. 1, 2011 for U.S. Appl. No. 12/345,490 (14 pages).
Office Action dated Aug. 19, 2011 for U.S. Appl. No. 12/345,490 (14 pages).
Office Action dated Mar. 26, 2012, for U.S. Appl. No. 12/646,114 ( 14 pages).
Final Office Action dated Jul. 19, 2012, for U.S. Appl. No. 12/646,114 13 pages).
Non-Final Office Action for U.S. Appl. No. 12/771,413, dated May 24, 2012 ( 20 pages).
Office Action dated Nov. 7, 2012 for U.S. Appl. No. 12/859,015 (7 pages).
Office Action dated Sep. 27, 2012 for U.S. Appl. No. 12/820,797 (32 pages).
Office Action dated Nov. 27, 2012 for U.S. Appl. No. 13/541,080 (8 pages).
Search Report for European Application No. 09170041.9, dated Nov. 23, 2009 (8 pages).
Examination Report for European Application No. 09170041.9, dated Mar. 13, 2012 (7 pages).
Partial Search Report for European Application No. 11188568.7, dated Feb. 22, 2012 (5 pgs).
Extended Search Report for European Application No. 12158266.2, dated Jun. 29, 2012 (7 pages).
Chinese Office Action dated Dec. 3, 2013 for Chinese Application No. 201110272723.3 (18 pages)-English translation).
Chinese Office Action dated Jul. 24, 2014 for Chinese Application No. 201110272723.3 (6 pages).
Chinese Office Action dated Jan. 20, 2015 for Chinese Application No. 201110272723.3 (4 pages).
Office Action issued by the European Patent Office for Application 11188568.7, dated Sep. 28, 2016, 4 pages.
Office Action—Intention to Grant—issued by the European Patent Office for Application 11188568.7, dated Jun. 1, 2017, 7 pages.
Extended European Search Report for European Application No. 17196024.8, dated Feb. 2, 2018, 8 pages.
Office Action and Search Report for Chinese Application No. 201510688928.8, dated Dec. 4, 2017, 9 pages.
Extended European Search Report for European Application No. 19191351.6, dated Nov. 20, 2019, 12 pages.
Chrysos, N. et al., "End-to-end congestion management for non-blocking multi-stage switching fabrics," Architectures for Networking and Communications Systems, ANCS' 10, Oct. 25-26, 2010, La Jolla, CA, pp. 1-2.

* cited by examiner

| Source ID 410 | Destination ID 412 | Payload 414 |

| Source ID 510 | Destination ID 520 | Priority ID 530 | Severity ID 540 |

METHODS AND APPARATUS FOR FLOW CONTROL ASSOCIATED WITH A SWITCH FABRIC

CROSS-REFERENCE TO RELATED APPLICATION

This application is a continuation of U.S. patent application Ser. No. 12/957,472 filed Dec. 1, 2010, entitled "METHODS AND APPARATUS FOR FLOW CONTROL ASSOCIATED WITH A SWITCH FABRIC" (U.S. Pat. No. 9,660,940), the contents of which are incorporated herein by reference.

BACKGROUND

Embodiments described herein relate generally to flow control, and, in particular, to flow control associated with multi-staged switch fabrics.

Transmission of data from a transmitter to a receiver via a physical link (e.g., an Ethernet link) can be, for example, disrupted because of congestion at a queue configured to receive the data. In some instances, the disruption can cause head-of-line (HOL) blocking and/or result in the loss of at least portions of the data due to buffer overflow. Known flow control protocols such as Ethernet pause (Institute of Electrical and Electronics Engineers (IEEE) 802.3x) and priority pause (IEEE 802.1Qbb) can be used to reduce buffer overflow in some applications, and quantized congestion notification (QCN) (IEEE 802.1Qau) can be used for management of data congestion within a multi-hop network that has relatively steady data flows. These known flow control protocols, however, may not adequately resolve congestion issues related to multi-stage queues and/or may not adequately handle the rapid onset of congestion within a hop-by-hop network link caused by, for example, bursts of data.

Thus, a need exists for methods and apparatus for data flow control between modules associated with a hop-by-hop network link.

SUMMARY

In some embodiments, an apparatus includes a flow control module configured to receive a first data packet from an output queue of a stage of a multi-stage switch at a first rate when an available capacity of the output queue crosses a first threshold. The flow control module is configured to receive a second data packet from the output queue of the stage of the multi-stage switch at a second rate when the available capacity of the output queue crosses a second threshold. The flow control module configured to send a flow control signal to an edge device of the multi-stage switch from which the first data packet or the second data packet entered the multi-stage switch.

DETAILED DESCRIPTION

Figure 1:
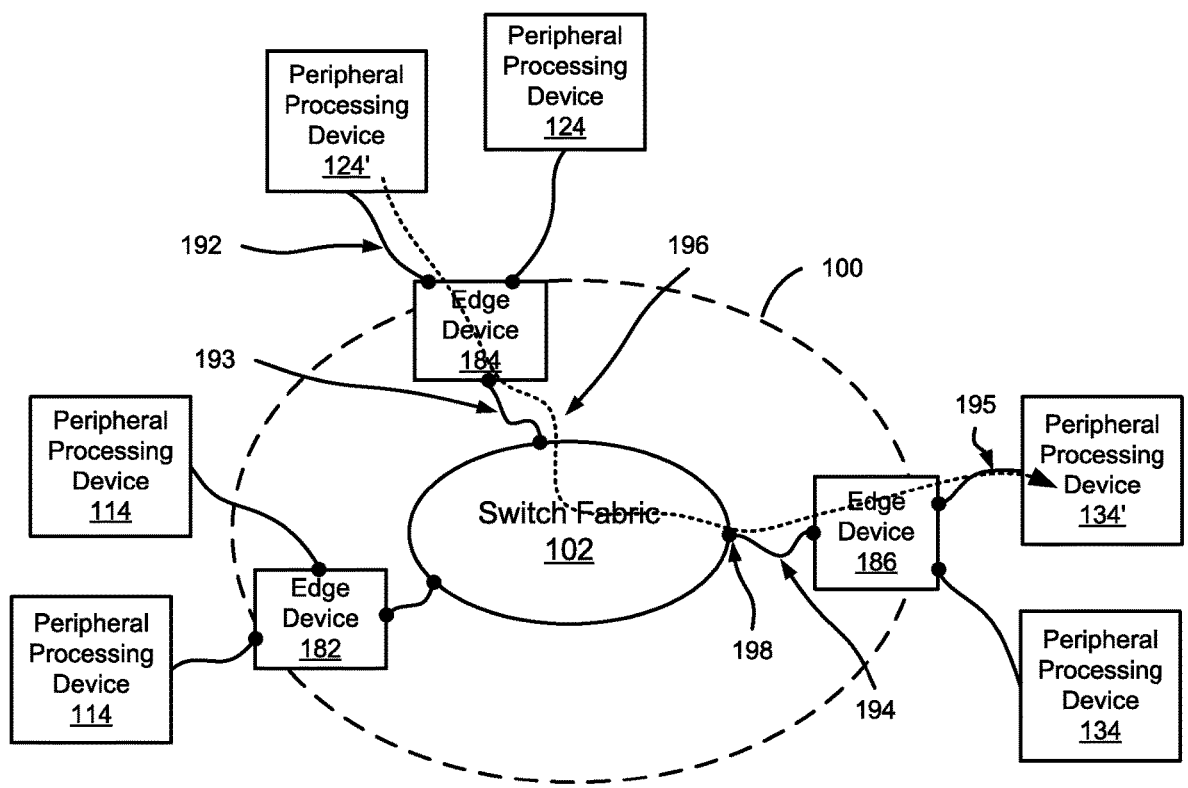
FIG. 1 is a system block diagram of a switch fabric system, according to an embodiment.

In some embodiments, an apparatus includes a flow control module configured to receive a first data packet from an output queue of a stage of a multi-stage switch at a first rate when an available capacity of the output queue crosses a first threshold. The flow control module is configured to receive a second data packet from the output queue of the stage of the multi-stage switch at a second rate when the available capacity of the output queue crosses a second threshold. The flow control module configured to send a flow control signal to an edge device of the multi-stage switch from which the first data packet or the second data packet entered the multi-stage switch.

In some embodiments, the first threshold is lower than the second threshold. More specifically, the available capacity of the output queue at the first threshold is greater than the available capacity of the output queue at the second threshold. Accordingly, as the output queue stores a greater number of data packets and as the available capacity of the output queue decreases, the flow control module receives more data packets. This causes the flow control module to send a greater number of flow control packets to edge devices. Statistically, a data flow originating at one or more edge devices causing congestion at the output queue will be regulated. Once the flow is regulated, the congestion at the output queue can decrease, increasing the available capacity of the output queue.

In some embodiments, an apparatus includes a first switch module of a distributed switch fabric. The first switch module is configured to receive multiple data packets from a set of second switch modules of the distributed switch fabric and store the multiple data packets in an output queue. The first switch module is configured to send a data packet in the output queue to an out-of-band flow control module if an available capacity of the output queue crosses a threshold such that the out-of-band flow control module sends a flow control signal to a source edge device associated with the data packet.

In some embodiments, the flow control module is out-of-band in that it is not within the normal data flow of a data packet through the distributed switch fabric (e.g., outside a data plane of the switch fabric). Accordingly, the operations of the flow control module do not disrupt and/or slow down the normal data flow of data packets through the switch fabric. Additionally, this allows the flow control module to send flow control packets to a source edge device via a low latency data path outside of the data plane of the switch fabric.

In some embodiments, a non-transitory processor-readable medium storing code represents instructions to cause a processor to receive an indicator of an available capacity of an output queue of a stage of a multi-stage switch. The code represents instructions to cause the processor to send a request for a data packet within the output queue if the indicator of the available capacity of the output queue satisfies a condition. The code further represents instructions to cause the processor to send a flow control signal to a source edge device of the data packet using a first flow control protocol such that the source edge device sends a flow control signal to a source peripheral processing device using a second flow control protocol.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated L2/L3 switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, a physical hop can operatively couple each stage within a switch fabric representing a single logical hop associated with a protocol used to route data outside the switch fabric. Additionally, packet classification and forwarding associated with a protocol used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used herein, a module that is within a switch fabric can be, for example, any assembly and/or set of operatively-coupled electrical components that define one or more switches within a stage of a switch fabric. In some embodiments, a module can include, for example, a memory, a processor, electrical traces, optical connectors, and/or the like.

As used in this specification, the singular forms "a," "an" and "the" include plural referents unless the context clearly dictates otherwise. Thus, for example, the term "a switch fabric" is intended to mean a single switch fabric or a combination of switch fabrics.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the third stage (the third and final stage with respect to the ingress to egress direction). For example, FIG. 2 refers to specific stages within a given switch fabric. In other instances, however, the terms "first stage", "second stage" and so on refer to any stage within the switch fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the second stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic diagram that illustrates a switch fabric system 100, according to an embodiment. The switch fabric system 100 includes a switch fabric 102 and multiple edge devices 182, 184, 186. The switch fabric system 100 operatively couples multiple peripheral processing devices 114, 124, 134 to each other. The peripheral processing devices 114, 124, 134 can be, for example, compute nodes, service nodes, routers, and storage nodes, as described in further detail herein. In some embodiments, for example, the peripheral processing devices 114, 124, 134 include servers, storage devices, gateways, workstations, and/or the like.

The peripheral processing devices 114, 124, 134 can be operatively coupled to the edge devices 182, 184, 186 of the switch fabric system 100 using any suitable connection such as, for example, an optical connection (e.g., an optical cable and optical connectors), an electrical connection (e.g., an electrical cable and electrical connectors) and/or the like. As such, the peripheral processing devices 114, 124, 134 are configured to send data (e.g., data packets, data cells, etc.) to the switch fabric system 100 via the edge devices 182, 184, 186. In some embodiments, the connection between the peripheral processing devices 114, 124, 134 and the edge devices 182, 184, 186, respectively, is a direct link. Such a link can be said to be a single physical hop link. In other embodiments, the peripheral processing devices can be operatively coupled to the edge devices via intermediate modules. Such a connection can be said to be a multiple physical hop link.

Each edge device 182, 184, 186 can be any device configured to operatively couple peripheral processing devices 114, 124, 134 to the switch fabric 102. In some embodiments, for example, the edge devices 182, 184, 186 can be access switches, input/output modules, top-of-rack devices and/or the like. Structurally, the edge devices 182, 184, 186 can function as both source edge devices and destination edge devices. Accordingly, the edge devices 182, 184, 186 can send data (e.g., a data stream of data packets and/or data cells) to and receive data from the switch fabric 102, and to and from the connected peripheral processing devices 114, 124, 134.

In some embodiments, the edge devices 182, 184, 186 can be a combination of hardware modules and software modules (executing in hardware). In some embodiments, for example, each edge device 182, 184, 186 can include a field-programmable gate array (FPGA), an application specific integrated circuit (ASIC), a digital signal processor (DSP) and/or the like.

The edge devices 182, 184, 186 can be configured to prepare a data packet (e.g., an Ethernet packet) to enter the switch fabric 102. For example, the edge devices 182, 184, 186 can be configured to forward, classify, and/or modify the packet encapsulation (e.g., modify, add and/or remove a header portion, footer portion and/or any other identifier included within the data packet) of a data packet prior to sending the data packet to the switch fabric 102. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Each of the edge devices 182, 184, 186 is configured to communicate with the other edge devices 182, 184, 186 via the switch fabric 102. Specifically, the switch fabric 102 is configured to provide any-to-any connectivity between the edge devices 182, 184, 186 at relatively low latency. For example, switch fabric 102 can be configured to transmit (e.g., convey) data between edge devices 182, 184, 186. In some embodiments, the switch fabric 102 can have at least hundreds or thousands of ports (e.g., egress ports and/or ingress ports) through which edge devices 182, 184, 186 can transmit and/or receive data.

The edge devices 182, 184, 186 can include one or more network interface devices (e.g., a 40 Gigabit (Gb) Ethernet interface, a 100 Gb Ethernet interface, etc.) through which the edge devices 182, 184, 186 can send signals to and/or receive signals from the switch fabric 102. The signals can be sent to and/or received from the switch fabric 102 via an electrical link, an optical link and/or a wireless link operatively coupled to the edge devices 182, 184, 186. In some embodiments, the edge devices 182, 184, 186 can be configured to send signals to and/or receive signals from the switch fabric 102 based on one or more protocols (e.g., an Ethernet protocol, a multi-protocol label switching (MPLS) protocol, a Fibre Channel protocol, a Fibre-Channel-over Ethernet protocol, an Infiniband-related protocol, a cell-based protocol, etc.).

As described in further detail herein, in some embodiments the edge devices 182, 184, 186 can be configured to send flow control signals to the peripheral processing devices 114, 124, 134. For example, the edge device 182 can send a flow control signal to one or more of the peripheral processing devices 114 when the edge device 182 receives a flow control signal from a module within the switch fabric 102. Similarly, the edge device 182 can send a flow control signal to one or more of the peripheral processing devices 114 when an available capacity of a queue and/or a buffer at the edge device 184 crosses (e.g., is less than) a threshold.

In some embodiments, such flow control signals between the edge devices 182, 184, 186 and the peripheral processing devices 114, 124, 134 can be based on any suitable protocol. For example, the flow control signals can be based on known standard flow control protocols such as Ethernet pause (Institute of Electrical and Electronics Engineers (IEEE) 802.3x), priority pause (IEEE 802.1Qbb), quantized congestion notification (QCN) (IEEE 802.1Qau), quantum flow control (QFC) and/or the like. In other embodiments, the flow control signals between the edge devices 182, 184, 186 and the peripheral processing devices 114, 124, 134 can be based on any other suitable protocol.

The switch fabric 102 can be any suitable switch fabric that operatively couples the edge devices 182, 184, 186 to the other edge devices 182, 184, 186. In some embodiments, for example, the switch fabric 102 can be a Clos network (e.g., a non-blocking Clos network, a strict sense non-blocking Clos network, a Benes network) having multiple stages of switching modules (e.g., integrated Ethernet switches). In some embodiments, for example, the switch fabric 102 can be similar to the three-stage switch fabric 200 shown in FIG. 2 and described in further detail herein. In other embodiments, the switch fabric 102 shown in FIG. 1 can include any number of stages. In such embodiments, for example, the switch fabric 102 can include five, seven or nine stages. The switch fabric 102 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the switch fabric 102 can be (e.g., can function as) a single consolidated switch (e.g., a single large-scale consolidated L2/L3 switch). In other words, the switch fabric 102 can be configured to operate as a single logical entity (e.g., a single logical network element). Similarly stated, the switch fabric 102 can be part of a single logical hop between a first edge device 182, 184, 186 and a second edge device 182, 184, 186 (e.g., along with the data paths between the edge devices 182, 184, 186 and the switch fabric 102). The switch fabric 102 can be configured to connect (e.g., facilitate communication between) the peripheral processing devices 114, 124, 134. In some embodiments, the switch fabric 102 can be configured to communicate via interface devices (not shown) configured to transmit data at a rate of at least 10 Gb/s. In some embodiments, the switch fabric 102 can be configured to communicate via interface devices (e.g., fibre-channel interface devices) configured to transmit data at a rate of, for example, 2 Gb/s, 4, Gb/s, 8 Gb/s, 10 Gb/s, 40 Gb/s, 100 Gb/s and/or faster link speeds.

Although the switch fabric 102 can be logically centralized, the implementation of the switch fabric 102 can be highly distributed, for example, for reliability. For example, portions of the switch fabric 102 can be physically distributed across, for example, many chassis. In some embodiments, for example, a processing stage of the switch fabric 102 can be included in a first chassis and another processing stage of the switch fabric 102 can be included in a second chassis. Both of the processing stages can logically function as part of a single consolidated switch (e.g., within the same logical hop) but have a separate single physical hop between respective pairs of processing stages. More details related to architecture of the switch fabric 102 are described herein.

In use, a data packet (e.g., an Ethernet packet) can be sent between peripheral processing devices 114, 124, 134 via the switch fabric system 100. For example, a data packet can be sent from a first peripheral processing device 124' to a second peripheral processing device 134' via path 196. The first peripheral processing device 124' can send the data packet to the edge device 184 via link 192. The edge device 184 can then prepare the data packet to enter the switch fabric 102. Once prepared, the edge device 184 sends the data packet to the switch fabric 102 via link 193. The switching modules within the switch fabric 102 can route the data packets through the switch fabric 102. The data packet is sent through port 198 to the edge device 186 via link 194. The edge device 186 can then send the data packet to the second peripheral processing device 134' via link 195 using the first protocol.

Figure 2:
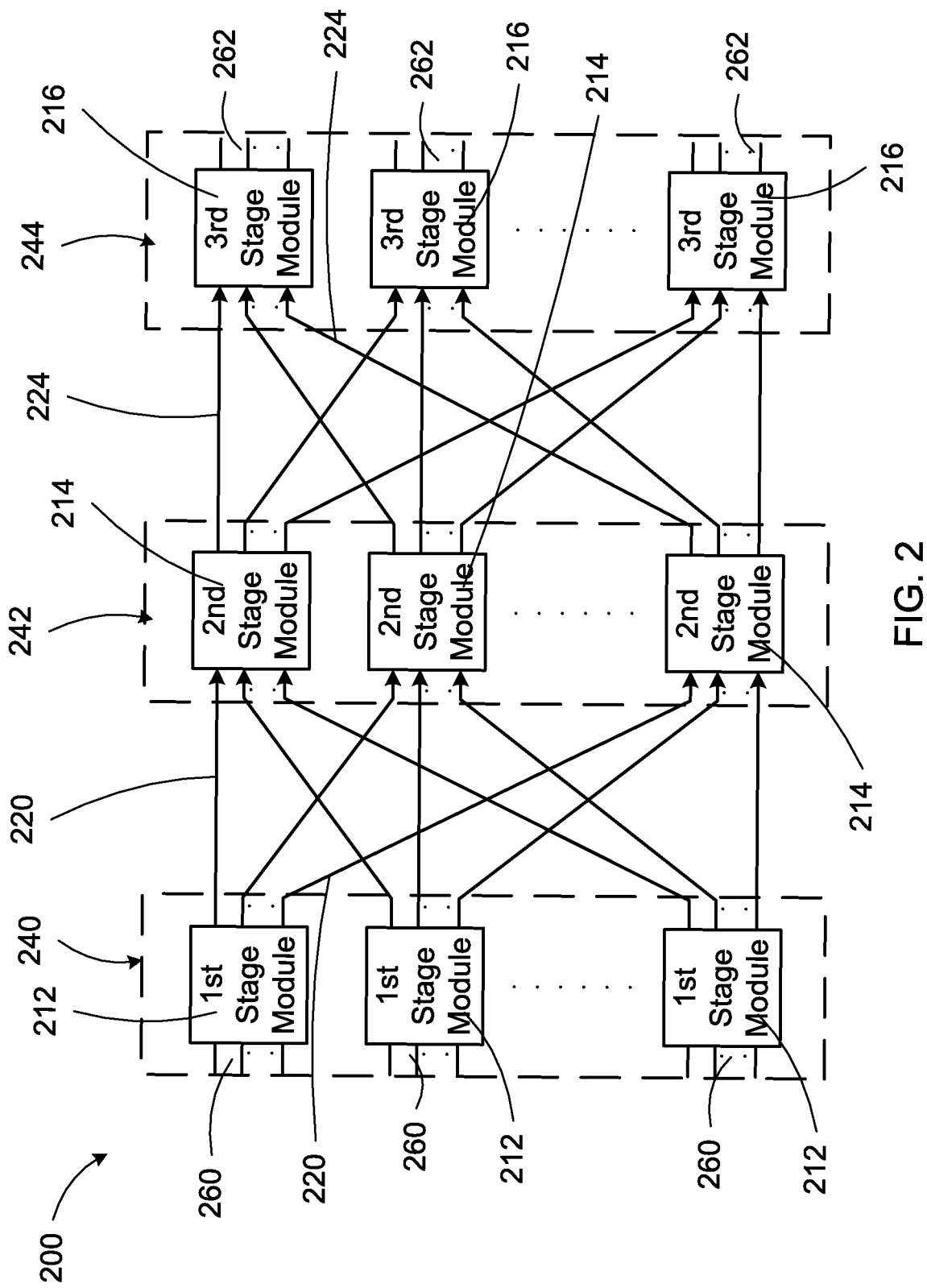
FIG. 2 is a schematic illustration of a switch fabric, according to another embodiment.

FIG. 2 is a schematic illustration of a switch fabric 200, according to an embodiment. The switch fabric 200 can include multiple physical hops that are within a single logical hop. Switch fabric 200 is a three-stage, non-blocking Clos network and includes a first stage 240, a second stage 242, and a third stage 244. The first stage 240 includes modules 212. Each module 212 of the first stage 240 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 212 of the first stage 240 is a switch (e.g., a packet switch, a frame switch, an integrated Ethernet switch and/or a cell switch). The switches are configured to redirect data (e.g., data packets, data cells, etc.) as it flows through the switch fabric 200. In some embodiments, for example, each switch includes multiple input ports operatively coupled to write interfaces on a memory buffer (not shown in FIG. 2). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period. Each switch operates similar to a crossbar switch that can be reconfigured subsequent each time period.

Each module 212 of the first stage 240 includes a set of input ports 260 configured to receive data (e.g., a signal, a cell of a packet, a data packet, etc.) as it enters the switch fabric 200. In this embodiment, each module 212 of the first stage 240 includes the same number of input ports 260.

Similar to the first stage 240, the second stage 242 of the switch fabric 200 includes modules 214. The modules 214 of the second stage 242 are structurally similar to the modules 212 of the first stage 240. Each module 214 of the second stage 242 is operatively coupled to each module 212 of the first stage 240 by a data path 220. Each data path 220 between a given module 212 of the first stage 240 and a given module 214 of the second stage 242 is configured to facilitate data transfer from the modules 212 of the first stage 240 to the modules 214 of the second stage 242.

The data paths 220 between the modules 212 of the first stage 240 and the modules 214 of the second stage 242 can be constructed in any manner configured to facilitate data transfer from the modules 212 of the first stage 240 to the modules 214 of the second stage 242. In some embodiments, for example, the data paths 220 are optical connectors between the modules. In other embodiments, the data paths are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each module of the second stage with each module of the first stage. In still other embodiments, two or more modules are contained within a single chip package and the data paths are electrical traces.

In some embodiments, the switch fabric 200 is a non-blocking Clos network. Thus, the number of modules 214 of the second stage 242 of the switch fabric 200 varies based on the number of input ports 260 of each module 212 of the first stage 240. In a rearrangeably non-blocking Clos network (e.g., a Benes network), the number of modules 214 of the second stage 242 is greater than or equal to the number of input ports 260 of each module 212 of the first stage 240. Thus, if n is the number of input ports 260 of each module 212 of the first stage 240 and m is the number of modules 214 of the second stage 242, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 244 of the switch fabric 200 includes modules 216. The modules 216 of the third stage 244 are structurally similar to the modules 212 of the first stage 240. The number of modules 216 of the third stage 244 is typically equivalent to the number of modules 212 of the first stage 240. Each module 216 of the third stage 244 includes output ports 262 configured to allow data to exit the switch fabric 200. Each module 216 of the third stage 244 includes the same number of output ports 262. Further, the number of output ports 262 of each module 216 of the third stage 244 is typically equivalent to the number of input ports 260 of each module 212 of the first stage 240. Accordingly, in such embodiments, the number of input ports of the switch fabric 200 can be the same as the number of output ports of the switch fabric 200.

Each module 216 of the third stage 244 is connected to each module 214 of the second stage 242 by a data path 224. The data paths 224 between the modules 214 of the second stage 242 and the modules 216 of the third stage 244 are configured to facilitate data transfer from the modules 214 of the second stage 242 to the modules 216 of the third stage 244.

The data paths 224 between the modules 214 of the second stage 242 and the modules 216 of the third stage 244 can be constructed in any manner configured to facilitate data transfer from the modules 214 of the second stage 242 to the modules 216 of the third stage 244. In some embodiments, for example, the data paths 224 are optical connectors between the modules. In other embodiments, the data paths are within a midplane. Such a midplane can be used to connect each module of the second stage with each module of the third stage. In still other embodiments, two or more modules are contained within a single chip package and the data paths are electrical traces.

In some embodiments, if a module 212, 214, 216 within the switch fabric 200 is congested (e.g., an available capacity of a buffer at the module 212, 214, 216 crosses a threshold), a flow control module (not shown in FIG. 2) operatively coupled to the congested module 212, 214, 216 can send a flow control signal to a one or more source edge device (e.g., edge devices 182, 184, 186). More specifically, the flow control module operatively coupled to the congested module 212, 214, 216 can sample (e.g., receive) one or more data packets within the buffer of the congested module 212, 214, 216. The flow control module can parse the data packet to determine from which edge device the data packet was sent and send a flow control signal to that edge device. Based on the flow control signal received from the flow control module, the edge device can send a flow control signal (e.g., IEEE 802.3x Ethernet pause, IEEE 802.1Qbb priority pause, IEEE 802.1Qau QCN, QFC, and/or the like) to the peripheral processing device (e.g., peripheral processing devices 114, 124, 134) from which the data packet originated. The peripheral processing device can suspend sending data packets to the edge device based on the flow control signal.

Figure 3:
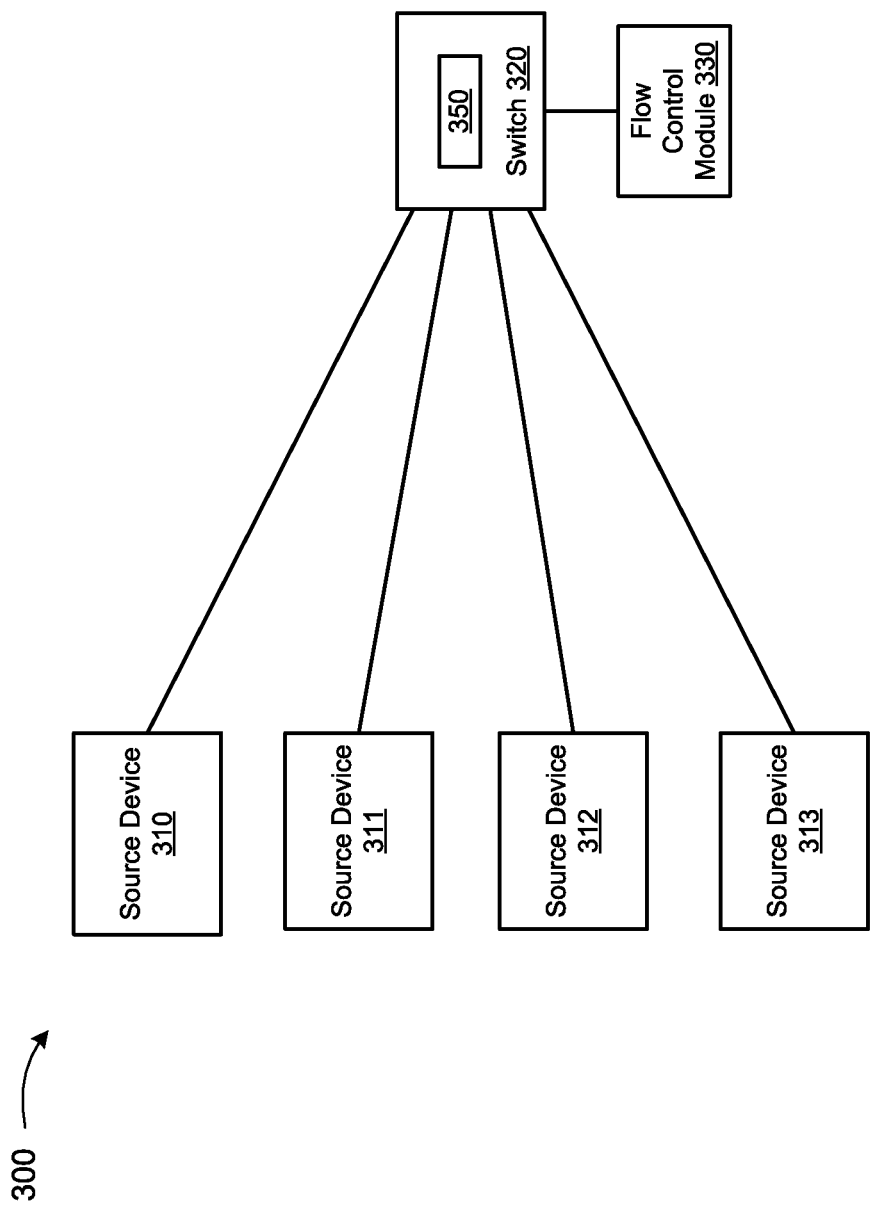
FIG. 3 is a schematic illustration of a portion of a switch fabric system, according to another embodiment.

FIG. 3, for example, illustrates a portion of a switch fabric system 300. The illustrated portion of the switch fabric system 300 includes a switch 320, a flow control module 330 operatively coupled to the switch 320 and multiple source devices 310, 311, 312, 313. The source devices 310, 311, 312, 313 can be similar to the edge devices 182, 184, 186 shown and described with respect to FIG. 1. As such, the source devices 310, 311, 312, 313 are operatively coupled to the switch 320 and are configured to send data packets to the switch 320, as described in further detail herein.

The switch 320 can be similar to the modules 212, 214, 216 of the switch fabric 200 shown and described with respect to FIG. 2. As such, the switch 320 can be part of a switch fabric similar to the switch fabric 200. While not shown in FIG. 3, the switch 320 can also include one or more output ports operatively coupled to other switch modules and/or destination devices. As such, the switch 320 can route a data packet received from a source device 310, 311, 312, 313 to a destination device (not shown in FIG. 3).

Figures 4, 5, 6:
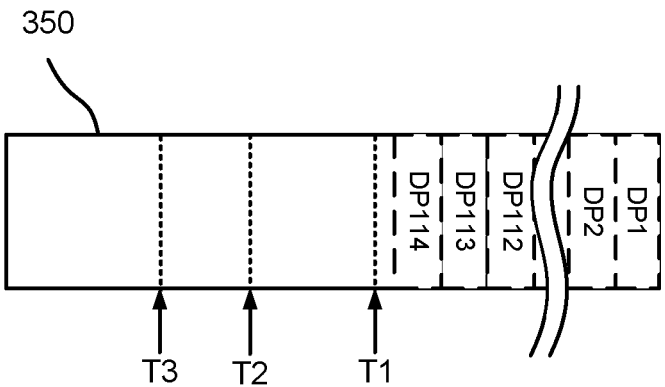
FIG. 4 is a schematic illustration of an output queue, according to another embodiment.
FIG. 5 is a schematic illustration of a data packet, according to another embodiment.
FIG. 6 is a schematic illustration of a flow control packet, according to another embodiment.

The switch 320 also includes an output queue 350 configured to buffer data packets received from the source devices 310, 311, 312, 313 prior to sending the data packets to other switch modules and/or destination devices (not shown in FIG. 3). FIG. 4 illustrates the output queue 350 in detail. As shown in FIG. 4, the output queue 350 can store data packets (e.g., DP1-DP114) waiting to be sent via an output port of the switch 320. The output queue 350 can be any suitable output queue. In some embodiments, for example, the output queue 350 operates as a first-in first-out (FIFO) buffer. In such embodiments, the data packets are sent via the output ports in the order received from the source devices 310, 311, 312, 313. In other embodiments, data packets can be assigned a priority level, with those data packets with a high priority level being moved to the front of the queue 350. In still other embodiments, queue 350 can be structured and/or divided into multiple priority-based queues.

The flow control module 330 is operatively coupled to the switch 320 and is configured to monitor an available capacity of the output queue 350. In some embodiments, for example, periodically (e.g., every 0.1 seconds) the switch 320 can send the flow control module 330 an indicator that represents an available capacity of the output queue 350. In other embodiments, the flow control module 330 can periodically request such an indicator from the switch 320. As described in further detail herein, based on the indicator, the flow control module 330 can determine whether or not a flow control signal should be sent to a source device 310, 311, 312, 313. More specifically, the flow control module 330 can determine whether an available capacity of the output queue 350 has crossed and/or is below one or more thresholds (e.g., T1, T2, T3 shown in FIG. 3). As described in further detail herein, the flow control module 330 can then send a flow control signal to one or more source devices 310, 311, 312, 313.

The flow control module 330 can be any suitable hardware module and/or software module (executing in hardware) configured to monitor an available capacity of the output queue 350 and/or configured to define and send flow control signals. In some embodiments, for example, the flow control module 330 can include a field-programmable gate array (FPGA), an application specific integrated circuit (ASIC), a digital signal processor (DSP) and/or the like.

In use, the source devices 310, 311, 312, 313 can send data packets to the switch 320. Such data packets can be similar to the data packet 400 shown in FIG. 5. As such, the data packet 400 can include a payload 414, a source identifier 410 and a destination identifier 412. The source identifier 410 can be an identifier of the source device 310, 311, 312, 313 sending the data packet 400. For example, if source device 310 sends the data packet 400 to the switch 320, the source identifier 410 can be an identifier of source device 310. Similarly, the destination identifier 412 can be an identifier of the destination device to which the packet is to be sent. In some embodiments, the source identifier 410 and/or the destination identifier 412 can be an internet protocol (IP) address, a media access control (MAC) address, a Fiber Channel identifier (FCID) and/or any other suitable identifier.

As the switch 320 receives data packets from one or more source devices 310, 311, 312, 313, the switch 320 stores the data packets in the output queue 350. Similarly, as output ports become available, the switch 320 removes data packets from the output queue 350 and sends the data packets via the output ports. If the switch 320 receives data packets from the source devices 310, 311, 312, 313 at a rate greater than a rate at which it sends the data packets via the output ports, a larger number of data packets will be stored in the output queue 350 over time and the available capacity of the output queue 350 will decrease.

In some embodiments, if the available capacity of the output queue 350 falls below a first threshold T1 but is above a second threshold T2, the flow control module 330 can begin to sample data packets from the output queue 350 at a first rate. More specifically, if the available capacity of the output queue falls below the first threshold T1 but is above the second threshold T2, the flow control module 330 sends a signal to the switch 320 requesting a data packet stored in the output queue 350. Such a signal can be sent periodically at the first rate (e.g., every 0.1 second) while the available capacity of the output queue 350 remains below the first threshold T1 but above the second threshold T2. In response to receiving such a signal from the flow control module 330, the switch 320 can send a data packet (e.g., data packet 400 shown in FIG. 5) from the output queue 350 to the flow control module 330. Accordingly, the switch 320 can send data packets to the flow control module 330 at the first rate while the available capacity of the output queue 350 is below the first threshold T1 but above the second threshold T2. In some embodiments, the switch 320 can select the data packet to send to the flow control module 330 based on a time that the switch 320 received the request. For example, the switch 320 can send the next data packet received by the switch 320 subsequent the switch 320 receiving the request. Similarly stated, the switch 320 can send the data packet received by the switch 320 substantially immediately after the switch 320 receives the signal from the flow control module 330. In other embodiments, the switch 320 can select the data packet randomly, based on the last data packet stored in the queue 350, the data packet stored in the queue 350 the longest, and/or using any other suitable method or algorithm.

Similarly, if the available capacity of the output queue 350 falls below a second threshold T2 or a third threshold T3, the flow control module 330 can stop sampling data packets from the output queue 350 at the first rate and begin to sample data packets from the output queue 350 at a second rate or a third rate, respectively. More specifically, the switch 320 can send data packets to the flow control module 330 at the second rate while the available capacity of the output queue 350 is below the second threshold T2 but above the third threshold T3. Similarly, the switch can send data packets to the flow control module 330 at the third rate while the available capacity of the output queue 350 is below the third threshold T3. In some embodiments, the second rate is greater than the first rate and the third rate is greater than the second rate and the first rate. In such embodiments, as the available capacity of the output queue 350 decreases, the number of data packets sent to the flow control module 330 increases.

The data packets received by the flow control module 330 can be used to define flow control packets to be sent to the source devices 310, 311, 312, 313. More specifically, the flow control module 330 can parse a received data packet to determine from which source device 310, 311, 312, 313 the data packet was received. For example, if the data packet 400 (shown in FIG. 5) is received at the flow control module 330, the flow control module 330 can parse the data packet 400 for the source identifier 410.

Using the source identifier 410, the flow control module 330 can define a flow control packet to be sent to the source device 310, 311, 312, 313 identified by the source identifier 410. Accordingly, the more data packets 400 received by the flow control module 330 (e.g., as the congestion in the output queue 350 increases and the available capacity of the output queue 350 decreases), the more flow control packets are sent. As described in further detail herein, this increases the probability that one or more of the data packets received by the flow control module 330 will include a source identifier of a source device 310, 311, 312, 313 sending the largest number of data packets to the switch 320. Accordingly, this increases the probability that such a source device will receive a flow control signal configured to regulate the data flow from that source device.

FIG. 6 is a schematic illustration of a flow control packet 500. The flow control packet 500 includes a source identifier 510, a destination identifier 520, a priority identifier 530 and a severity identifier 540. The source identifier 510 of the flow control packet 500 can be an identifier associated with the switch 320. As such, the source identifier 510 identifies at which switch (i.e., switch 320) the congestion is occurring. The destination identifier 520 of the flow control packet 500 can be the source identifier 410 of the data packet 400 received by the flow control mould. Similarly stated, because the flow control packet 500 is to be sent to the source device 310, 311, 312, 313 from which the data packet 400 was sent, the source identifier 410 of the data packet 400 is used as the destination identifier 520 of the flow control packet 500.

The priority identifier 530 of the flow control packet 500 indicates the priority of the flow control packet 500 in the switch fabric system 300. In some embodiments, for example, the priority identifier 530 of a flow control packet 500 is "high." In such embodiments, a priority identifier of a data packet 400 can be "low." Accordingly, flow control packets are sent through the switch fabric system 300 ahead of data packets (i.e., flow control packets take priority over data packets when a module within the switch fabric system 300 determines which packet within an output queue to send next). In other embodiments, a value of the priority identifier 530 can be based on any other parameter such as, for example, the severity identifier 540 of the data packet 500, the source identifier 410 of the data packet 400, a destination identifier 412 of the data packet 400, and/or the like.

The severity identifier 540 of the flow control packet can indicate the severity of congestion at the switch 320. In some embodiments, for example, if the available capacity of the output queue 350 is less than the first threshold T1 but greater than the second threshold T2 the severity identifier 540 can be a first value (e.g., "low"). Similarly, if the available capacity of the output queue 350 is less than the second threshold T2 but greater than the third threshold or if the available capacity of the output queue 350 is less than the third threshold, the severity identifier 540 can be a second value (e.g., "medium") or a third value (e.g., "high"), respectively.

In some embodiments, the flow control module 330 sends the flow control packet 500 to a source device 310, 311, 312, 313 identified by the source identifier 410 of the data packet 400 via an out-of-band control plane connection (not shown in FIG. 3). Similarly stated, in some embodiments, the flow control module 330 sends the flow control packet 500 to a source device 310, 311, 312, 313 via a connection other than the connection through which the data packet 400 was sent to the switch 320 (and/or within a different connection plane). Using such an out-of-band connection, the time it takes for the source device 310, 311, 312, 313 to receive the flow control packet 500 from the flow control module 330 can be reduced. For example, such a connection can be dedicated to the flow control signals and/or other control plane and/or management plane signals. As such, the out-of-band connection between the flow control module 330 and the source devices 310, 311, 312, 313 can be a low latency connection.

In other embodiments, the flow control module 330 sends the flow control packet 500 to a source device 310, 311, 312, 313 identified by the source identifier 410 of the data packet 400 via the data plane connections. Similarly stated, in such embodiments, the flow control module 330 sends the flow control packet 500 to a source device 310, 311, 312, 313 via the same connection (and/or within the same connection plane) as the connection through which the data packet 40 was sent to the switch 320. Using the priority identifier 530, flow control signals 500 can be given priority to data signals in the data plane of the switch fabric system 300. Accordingly, the latency associated with sending a flow control signal 500 between the flow control module 330 and a source device 310, 311, 312, 313 can be less than the latency associated with sending a data packet 400 between a source device 310, 311, 312, 313 and the switch 320.

The source device 310, 311, 312, 313 receives the flow control packet 500 and, according to the severity identifier 540, takes appropriate action. In some embodiments, for example, the source device 310, 311, 312, 313 can identify from which peripheral processing device (not shown in FIG. 3) coupled to the source device 310, 311, 312, 313 the data packet originated (e.g., using the source identifier 510 of the flow control packet 500 and/or another portion of the flow control packet not shown in FIG. 6) and send a flow control message to that peripheral processing device. In other embodiments, in response to receiving the flow control packet, the source device 310, 311, 312, 313 can send a flow control message to a random peripheral processing device to which it is coupled, a peripheral processing device from which the source device 310, 311, 312, 313 receives a greatest number of data packets and/or any other peripheral processing device to which the source device 310, 311, 312, 313 is coupled. In some embodiments, such a flow control message can be a standard flow control message such as, for example, IEEE 802.3x Ethernet pause, IEEE 802.1Qbb priority pause, IEEE 802.1Qau QCN, QFC, and/or the like. The peripheral processing device can be configured to reduce and/or suspend sending data packets to the source device 310, 311, 312, 313 as a result of receiving the flow control message.

In some embodiments, the source device 310, 311, 312, 313 can be configured to suspend and/or reduce sending data packets to the switch 320 based on receiving the flow control packet 500. In other embodiments, the source device 310, 311, 312, 313 can be configured to send a flow control message to the peripheral processing device along with suspending and/or reducing the data packets the source device 310, 311, 312, 313 sends to the switch 320. Such a suspension and/or reduction of data packets sent by the peripheral processing device and/or the source device 310, 311, 312, 313 causes fewer data packets to be received at the switch 320 and thus the available capacity in the output queue 350 to increase.

In some embodiments, such a reduction and/or suspension of sending data packets by the source device 310, 311, 312, 313 and/or by one or more peripheral processing devices coupled to the source device 310, 311, 312, 313 can be for a period of time. For example, after a predetermined amount of time has passed since receiving the flow control signal, the source device 310, 311, 312, 313 and/or the one or more peripheral processing devices coupled to the source device 310, 311, 312, 313 can resume sending data packets at a normal rate. In other embodiments, such a reduction and/or suspension of sending data packets by the source device 310, 311, 312, 313 and/or by one or more peripheral processing devices coupled to the source device 310, 311, 312, 313 can be until receiving a resume message from the flow control module 330. In such embodiments, the flow control module 330 can define and send a resume signal to the source device 310, 311, 312, 313 after the available capacity of the output queue 350 has risen above one or more of the thresholds T1, T2, and/or T3.

Figure 7:
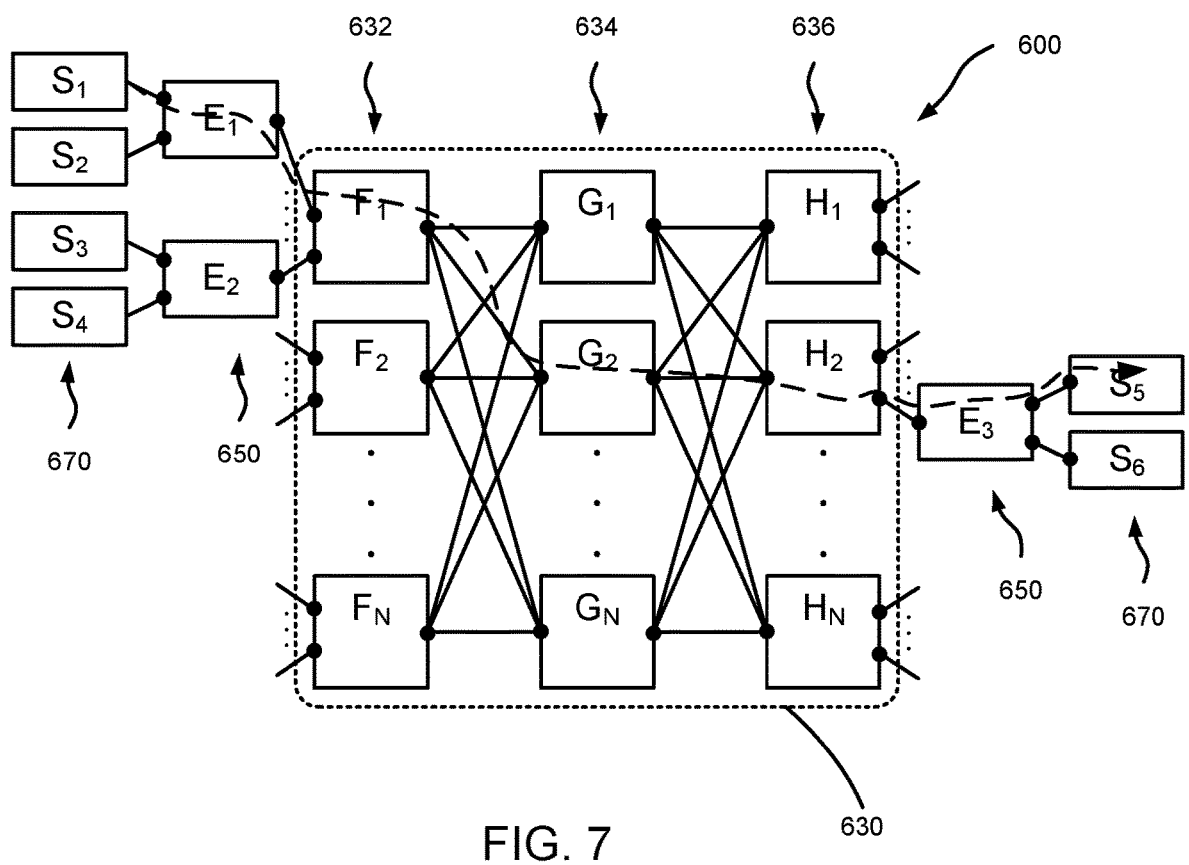
FIG. 7 is a system block diagram of a switch fabric system, according to another embodiment.

FIG. 7 is a schematic illustration of a switch fabric system 600, according to another embodiment. The switch fabric system 600 includes a switch fabric 630, multiple edge devices 650 operatively coupled to the switch fabric 630, and multiple peripheral processing devices 670 operatively coupled to the edge devices 650. As described in further detail herein, a first peripheral processing device 670 (e.g., $S_1$) is configured to send a data packet to a second peripheral processing device 670 (e.g., $S_5$) via a first edge device 650 (e.g., $E_1$), the switch fabric 630, and a second edge device 650 (e.g., $E_3$).

The switch fabric 630 can be structurally and functionally similar to the switch fabric 200 (shown and described with respect to FIG. 2). Accordingly, the switch fabric includes modules $F_1$-$F_N$ associated with a first stage 632 of the switch fabric 630, modules $G_1$-$G_N$ associated with a second stage 634 of the switch fabric 630, and modules $H_1$-$H_N$ associated with a third stage 636 of the switch fabric 630. Each module $F_1$-$F_N$ associated with the first stage 632 is operatively coupled to each module $G_1$-$G_N$ associated with the second stage 634 via data paths. Similarly, each module $G_1$-$G_N$ associated with the second stage 634 is operatively coupled to each module $H_1$-$H_N$ associated with the third stage 636. The data paths between the modules $F_1$-$F_N$ associated with the first stage 632 and the modules $G_1$-$G_N$ associated with the second stage 634 and/or the data paths between the modules $G_1$-$G_N$ associated with the second stage 634 and the modules $H_1$-$H_N$ associated with the third stage 636 can be constructed in any manner configured to facilitate data transfer. In some embodiments, for example, the data paths include optical connectors, optical fibers and/or electrical connectors between the modules. In some embodiments, the data paths are within a midplane or a backplane.

Figure 8:
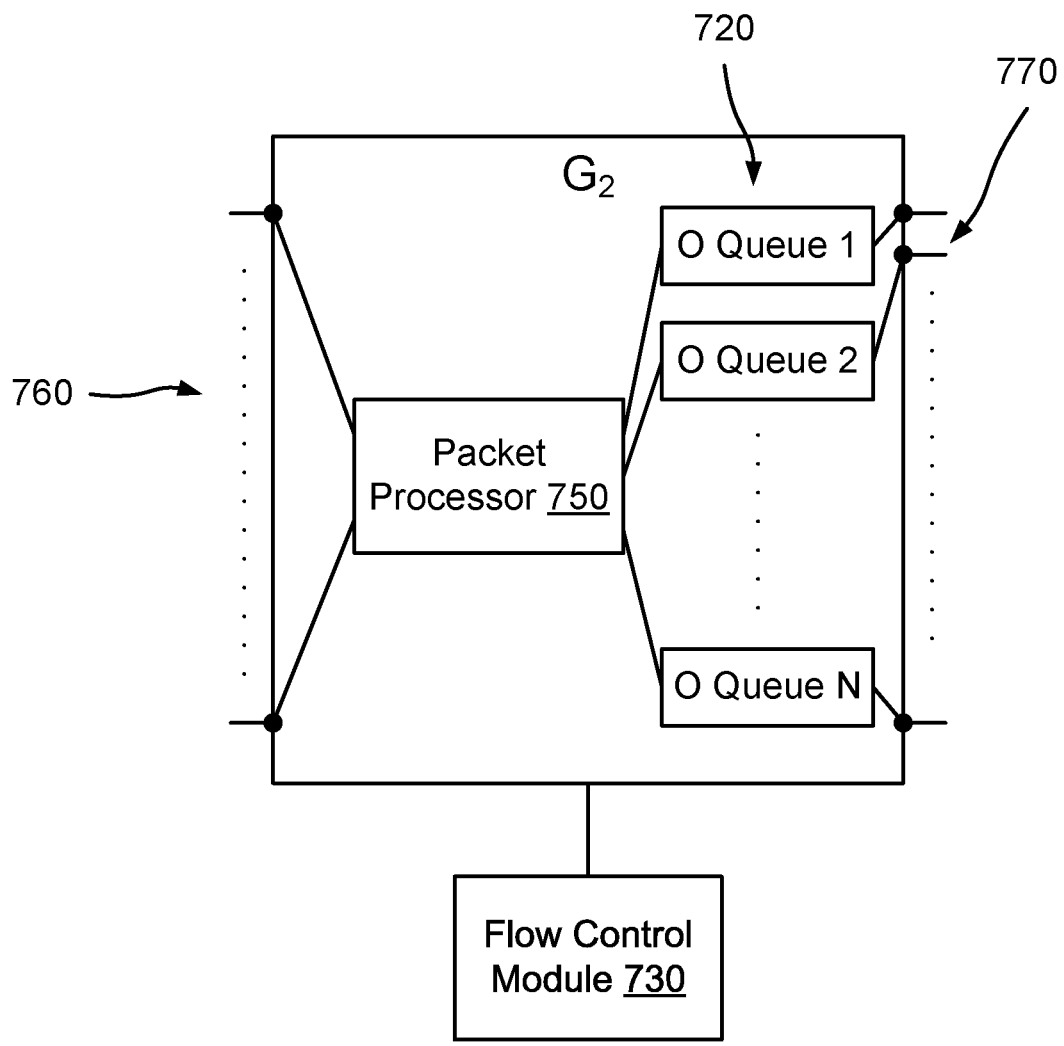
FIG. 8 is a schematic illustration of a module within a switch fabric, according to another embodiment.

FIG. 8 illustrates a module $G_2$ within the switch fabric 630. While the illustrated module $G_2$ is associated with the second stage 634 of the switch fabric 630 (see e.g., FIG. 7), the modules associated with the first stage 632 and the modules associated with the third stage 636 can be structurally and functionally similar to the module $G_2$ shown in FIG. 8. The module $G_2$ includes multiple input ports 760, multiple output ports 770, multiple output queues 720 and a packet processor 750. Additionally, a flow control module 730 is operatively coupled to the module $G_2$.

The input ports 760 can be any ports suitable to receive data packets from a module $F_1$-$F_N$ associated with the first stage 632 of the switch fabric 630. Accordingly, the input ports 760 can operatively couple the module $G_2$ with the modules $F_1$-$F_N$ associated with the first stage 632 via the data paths between the modules $F_1$-$F_N$ and the module $G_2$ (see FIG. 7). Similarly, the output ports 770 can be any ports suitable to send data packets to a module $H_1$-$H_N$ associated with the third stage 636 of the switch fabric 630. Accordingly, the output ports 770 can operatively couple the module $G_2$ with the modules $H_1$-$H_N$ associated with the third stage via the data paths between the modules $H_1$-$H_N$ and the module $G_2$.

In some embodiments, the module G2 includes an output queue 720 for each output port 770. Accordingly, as described in further detail herein, the packet processor 750 can store data packets to be sent on a given output port 770 in its respective output queue 720. As such, the output queues 720 can be configured to buffer data packets received at the module $G_2$ via the input ports 760. The output queues 720 can be any suitable output queues. In some embodiments, for example, the output queues 720 operate as first-in first-out (FIFO) buffers. In such embodiments, the data packets are sent via the output ports 770 in the order received from the packet processor 750. In other embodiments, data packets can be assigned a priority level, with those data packets with a high priority level being moved to the front of the output queues 720. In still other embodiments, the output queues 720 can be structured and/or divided into multiple priority-based queues.

In some embodiments, the output queues 720 can be part of a shared memory buffer (not shown in FIG. 8) implemented using on-chip static random access memory (SRAM) to provide sufficient bandwidth for the packet processor 750 to write one incoming cell (e.g., a portion of a data packet) or data packet per input port 760 per time period (e.g., one or more clock cycles), and all output ports 770 to read one outgoing cell or data packet per time period. The shared memory buffer can be partitioned to include the output queues 720. In some embodiments, each output port 770 is associated with an output queue 720. As such, the data packets to be sent via an output port 770 are stored and/or buffered in the output queue 720 associated with that output port 770.

In some embodiments, the size of each output queue 720 can be dynamic and/or variable. As such, based on the number of data packets to be sent via an output port 770, the output queue 720 associated with that output port 770 can expand or contract. For example, if, at a first time, the output port 770 associated with O Queue 1 has a greater number of data packets and/or cells buffered to be sent than the output port 770 associated with O Queue 2, the size of O Queue 1 can be greater than the size of O Queue 2. Similarly, if, at a second time, the output port 770 associated with O Queue 2 has a greater number of data packets and/or cells buffered to be sent than the output port 770 associated with O Queue 1, the size of O Queue 2 can be greater than the size of O Queue 1. Accordingly, the shared memory buffer can be dynamically allocated based on the needs and/or requirements of the various output queues 720.

In some embodiments, each output queue 720 can have a maximum size. This ensures that a single output queue 720 does not use a large or unfair portion of the shared memory at the expense of another output queue 720 that also uses the shared memory. In some embodiments, when a queue 720 exceeds its maximum size, a data packet can be sent to the flow control module as described in further detail herein. In some embodiments, each output queue 720 can also have a minimum size. Such a minimum size ensures that each output queue 720 can always handle at least a small number of data packets.

The packet processor 750 can be any suitable processor configured to receive and/or read data packets from the input ports 760, process and/or route the data packets, and send and/or store the data packets to the output queues 720. For example, the packet processor 750 can receive a data packet received via an input port 760 operatively coupling the module $G_2$ with the modules $F_1$-$F_N$ associated with the first stage 632. Such a data packet can include a source ID and a destination ID, and can be similar to the data packet 400 of FIG. 5. Additionally, in some embodiments, for example, the data packet can include at least a portion of an IP 5-tuple. In such embodiments, for example, the header can include a destination MAC address, a destination IP address, a source MAC address, a source IP address and/or a transfer protocol. In other embodiments, the header can include any other identifying information associated with the data packet, such as, for example, a priority indicator.

The packet processor 750 can use the information within the header to assign the data packet to an output queue 720 associated with a data path operatively coupling the module $G_2$ and a module $H_1$-$H_N$ associated with the third stage 636. For example, the packet processor 750 can assign the data packet to an output queue 720 randomly, based on the available capacity of each output queue 720, based on the results of a hash function, based on a look-up table, based on an indication from a central controller (not shown in FIGS. 7 and 8) and/or using any other method. Such a hash function and/or look-up table can use as an input a header value such as, for example, a destination MAC address, a destination IP address, a source MAC address, a source IP address, a priority indicator, a transfer protocol and/or any other suitable value. In some embodiments, for example, a look-up table and/or a hash function can associate each output queue 720 with a range of IP and/or MAC addresses.

The flow control module 730 can be structurally and functionally similar to the flow control module 330 shown and described with respect to FIG. 3. As such, the flow control module 730 can be any suitable hardware module and/or software module (executing in hardware) configured to monitor an available capacity of the output queues 720. In some embodiments, for example, the flow control module 730 can include a field-programmable gate array (FPGA), an application specific integrated circuit (ASIC), a digital signal processor (DSP) and/or the like. In some embodiments, the flow control module 730 can include a processor and a memory storing program code to be executed by the processor.

Similar to the flow control module 330 (FIG. 3), the flow control module 730 can monitor the output queues 720 and request a data packet from an output queue if the available capacity falls below a threshold. As described in further detail herein, the flow control module 730 can define and send a flow control packet to an edge device 650 from which the data packet was sent in response to receiving the data packet. In some embodiments, and as described above, the flow control module 730 can request data packets from the module $G_2$ at a higher rate as the available capacity of an output queue 720 decreases. Accordingly, more flow control packets can be defined and sent by the flow control module 730 as the number of data packets stored in an output queue 720 increases and the available capacity of the output queue 720 decreases.

In some embodiments, the flow control module 730 monitors each output queue 720 separately. Accordingly, for example, if the available capacity of the output queue O Queue 1 falls below a threshold, the flow control module 730 will receive data packets from O Queue 1 but not the other output queues 720. In such an example, flow control packets will be sent to the edge devices 650 that are sending data packets to module $G_2$ that are being placed and/or stored in O Queue 1. Similarly, for another example, if the available capacity of the output queue O Queue 2 falls below a threshold, the flow control module 730 will receive data packets from O Queue 2 but not the other output queues 720. In such an example, flow control packets will be sent to the edge devices 650 that are sending data packets to module $G_2$ that are being placed and/or stored in O Queue 2. This allows each flow control packet to be specific to an output queue 720 without affecting the edge devices 650 sending data packets to the other output queues 720 that each have an available capacity greater than the threshold.

In other embodiments, the flow control module 730 monitors the output queues 720 collectively. For example, if the output queues 720 are part of a single shared memory buffer, the flow control module 730 can monitor the available capacity of the single shared memory buffer. If the available capacity of the single shared memory buffer falls below a threshold, the flow control module 730 can request a data packet from the shared memory buffer. In some embodiments, the data packet can be selected from a random output queue 720, from the output queue storing the greatest number of data packets and/or the like.

In some embodiments, the flow control module 730 can include and/or be coupled to a memory (not shown) containing a history of the flow control signals sent to the modules $F_1$-$F_N$ associated with the first stage 632. Such a history can include a time the flow control signal was sent, a suspension time period, and/or any other information associated with the flow control signal. Maintaining a history can reduce the number of flow control signals sent between the modules by reducing and/or eliminating redundant flow control signals. For example, if the flow control module 730 sends a flow control signal to a module $F_1$-$F_N$ associated with the first stage 632, the history can ensure that the flow control module 730 does not send redundant and/or duplicative flow control signals to the module $F_1$-$F_N$ associated with the first stage 632 within a particular time period.

For example, the flow control module 730 can be configured to send only a single flow control signal to a specific module $F_1$-$F_N$ associated with the first stage 632 every 10 seconds.

Returning to FIG. 7, the peripheral processing devices 670 can be, for example, compute nodes, service nodes, routers, and storage nodes, as described in further detail herein. In some embodiments, for example, the peripheral processing devices 670 include servers, storage devices, gateways, workstations, and/or the like. The peripheral processing devices 670 can be operatively coupled to the edge devices 650 using any suitable connection such as, for example, an optical connection (e.g., an optical cable and optical connectors), an electrical connection (e.g., an electrical cable and electrical connectors) and/or the like. As such, the peripheral processing devices 670 are configured to send data (e.g., data packets, data cells, etc.) to the edge devices 650.

The edge devices 650 can be any devices configured to operatively couple peripheral processing devices 670 to the switch fabric 630. In some embodiments, for example, the edge devices 650 can be access switches, input/output modules, top-of-rack devices and/or the like. Edge devices $E_1$ and $E_2$ are schematically shown as source edge devices and edge device $E_3$ is schematically shown as a destination edge device for illustration purposes only. Structurally, the edge devices 650 (including $E_1$, $E_2$, and $E_3$) can function as source edge devices and destination edge devices. Accordingly, the edge devices 650 can send data to and receive data from the switch fabric 630.

While shown in FIG. 7 as being operatively coupled to a single module $F_1$ associated with the first stage 632, the edge device $E_1$ can be coupled to any number of modules associated with the first stage 632. Additionally, while shown in FIG. 7 as being operatively coupled to a single switch fabric 630, the edge device $E_1$ can be operatively coupled to any number of switch fabrics, similar to switch fabric 630. In some embodiments, for example, the edge device $E_1$ can be both coupled to the module $F_1$ associated with the first stage of the switch fabric 630 and a module associated with a first stage of a second switch fabric (not shown in FIG. 7). In such embodiments, the edge device $E_1$ can send data to either the module $F_1$ or the module associated with the first stage of the second switch fabric.

In some embodiments, the edge devices 650 can be configured to prepare a data packet to enter the switch fabric 630. For example, the edge devices 650 can be configured to forward, classify, and/or modify the packet encapsulation of a data packet prior to sending the data packet to the switch fabric 630. In some embodiments, for example, the edge devices 650 can append a source identifier (e.g., source MAC address, IP address, etc.), a destination identifier (e.g., source MAC address, IP address, etc.) and/or any other information to the data packet. Such information can be used to route the data packet through the switch fabric 630.

In some embodiments the edge devices 650 can be configured to send flow control signals to the peripheral processing devices 670. For example, the edge device $E_1$ can send a flow control signal to one or more of the peripheral processing devices $S_1$ and $S_2$ when the edge device $E_1$ receives a flow control signal from a flow control module within the switch fabric 630 (e.g., flow control module 730). Similarly, the edge device $E_1$ can send a flow control signal to one or more of the peripheral processing devices $S_1$ and $S_2$ when an available capacity of a queue and/or a buffer at the edge device $E_1$ crosses (e.g., is less than) a threshold.

In some embodiments, such flow control signals between the edge devices 650 and the peripheral processing devices 670 can be based on any suitable protocol different from the flow control protocol used between modules within the switch fabric 630 and edge devices 650. For example, the flow control signals can be based on known standard flow control protocols such as Ethernet pause (Institute of Electrical and Electronics Engineers (IEEE) 802.3x), priority pause (IEEE 802.1Qbb), quantized congestion notification (QCN) (IEEE 802.1Qau), quantum flow control (QFC) and/or the like. In other embodiments, the flow control signals between the edge devices 650 and the peripheral processing devices 670 can be based on any other suitable protocol including the protocol used between modules within the switch fabric 630 and edge devices 650.

In use, for example, a peripheral processing device $S_1$ can be configured to send a data packet to another peripheral processing device $S_5$. FIG. 7 represents the peripheral processing device $S_1$ sending a data packet to peripheral processing device $S_5$ by way of example. Any peripheral processing device 670 operatively coupled to the switch fabric 630 via an edge device 650 can send a data packet to any other peripheral processing device 670 coupled to the switch fabric 630 via an edge device 650.

The peripheral processing device $S_1$ can send the data packet to the edge device $E_1$. In some embodiments, the data packet can include a payload and a header. The payload can include data to be sent to peripheral processing device $S_5$. The header can include identifying information. In some embodiments, for example, the header can include at least a portion of an IP 5-tuple associated with the source and destination peripheral processing devices 670. In such embodiments, for example, the header can include a destination peripheral processing device MAC address, a destination peripheral processing device internet protocol (IP) address, a source peripheral processing device MAC address, a source peripheral processing device IP address and/or a transfer protocol identifier. In the present example, the destination peripheral processing device MAC address and the destination peripheral processing device IP address can be associated with peripheral processing device $S_5$, and the source peripheral processing device MAC address and the source peripheral processing device IP address can be associated with peripheral processing device $S_1$. In some embodiments, the edge device $E_1$ can also append a source edge device identifier (e.g., a MAC and/or IP address associated with $E_1$) and a destination edge device identifier (e.g., a MAC and/or IP address associated with $E_3$). Such information can be used in conjunction with a lookup table to route the data packet through the switch fabric 630 as shown and described in U.S. patent application Ser. No. 12/607,162, filed on Nov. 18, 2009, entitled "Methods and Apparatus Related to a Distributed Switch Fabric," which is incorporated herein by reference in its entirety. Using such source and destination specific information in conjunction with a lookup table to route data packets through the switch fabric 630 can ensure that each data packet originating from a particular source to be sent to a particular destination will be sent through the switch fabric 630 via the same path (e.g., through the same modules associated with each stage of the switch fabric 630). Similarly stated, the order of data packets sent through the switch fabric 630 from a first edge device 650 to a second edge device 650 is maintained.

Using the information contained within the header of the data packet, the edge device $E_1$ can determine to which module $F_1$-$F_N$ to send the data packet. In some embodiments, for example, the edge device $E_1$ can use a hash function using as inputs the destination peripheral processing device MAC address, the destination peripheral processing device IP address, the source peripheral processing device MAC address, the source peripheral processing device IP address, the destination edge device identifier, the source edge device identifier and/or the transfer protocol identifier to determine to which module $F_1$-$F_N$ to send the data packet.

After the module $F_1$ associated with the first stage 632 receives the data packet, the module $F_1$ determines to send the data packet to the module $G_2$ associated with the second stage 634. In some embodiments, for example, the module $F_1$ can use a hash function using as an input a destination identifier and/or a source identifier. Based on the inputs to the hash function, the module $F_1$ can forward the data packet to the module $G_2$ associated with the second stage 634. The module $G_2$ can similarly forward the data packet to the module $H_2$ associated with the third stage 636. Using the destination edge device identifier, the module $H_2$ can forward the data packet to the destination edge device $E_3$. Using the destination peripheral processing device identifier, the edge device $E_3$ can then forward the data packet to the destination peripheral processing device $S_5$.

As discussed above, if congestion occurs at a module $F_1$-$F_N$, $G_1$-$G_N$, $H_1$-$H_N$ within the switch fabric 630, that module $F_1$-$F_N$, $G_1$-$G_N$, $H_1$-$H_N$ can send a data packet from a congested queue at the module to a flow control module. The flow control module can define and send a flow control signal to the edge device $E_1$ (or another edge device 650 based on the source of the data packet). In some embodiments, the edge device $E_1$ can then send a flow control signal to the peripheral processing device $S_1$ and/or the peripheral processing device $S_2$. Accordingly, the source device $S_1$ and/or $S_2$ and/or the edge device $E_1$ can suspend and/or reduce sending data packets to the switch fabric 630 for a time period and/or until receiving a resume signal from the flow control module. This reduces the number of data packets received at the congested queue, thus reducing the congestion and increasing the available capacity at the queue.

Figure 9:
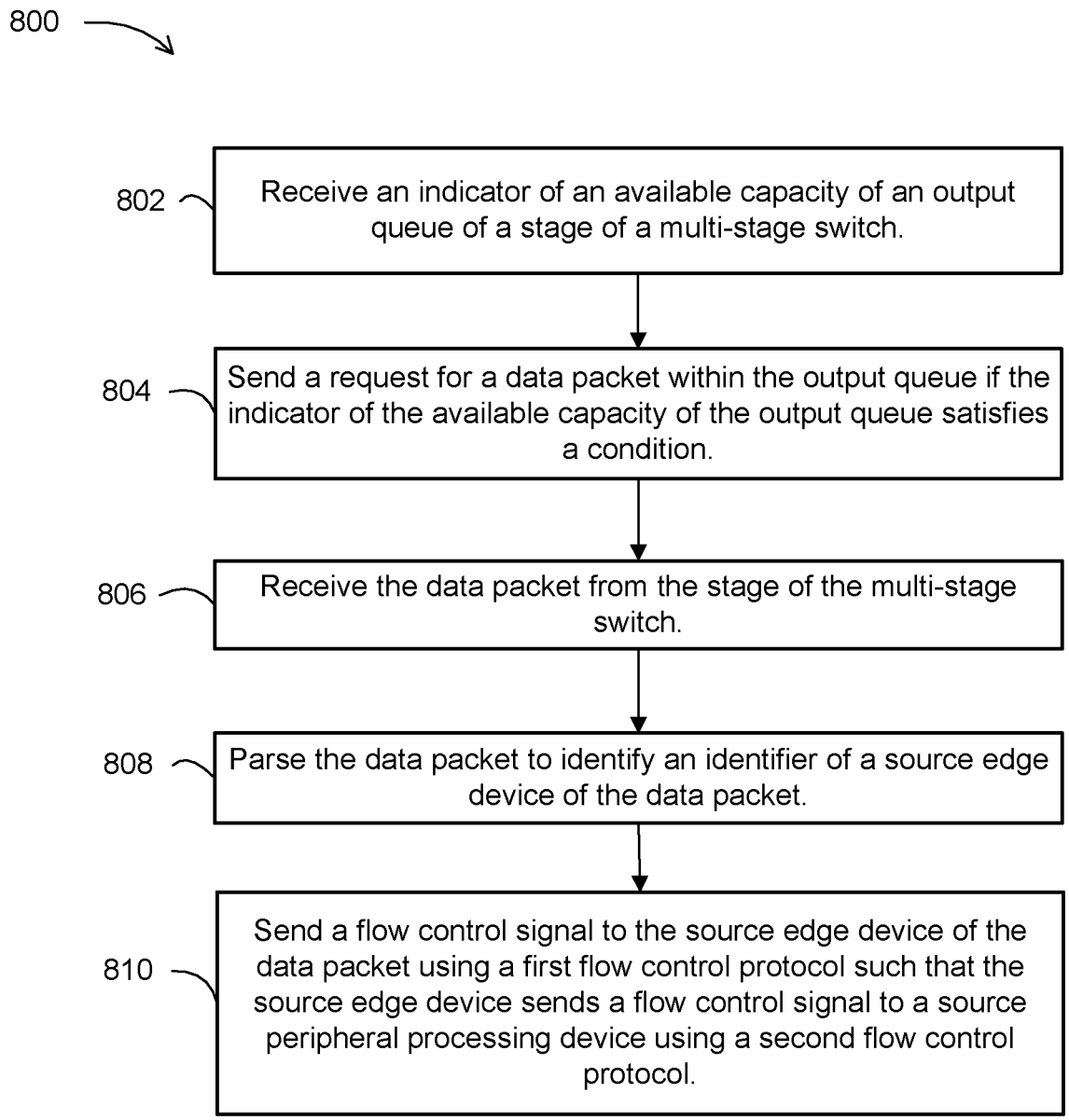
FIG. 9 is a flow chart illustrating a method of sending a flow control signal, according to another embodiment.

FIG. 9 is a flow chart illustrating a method 800 of sending a flow control signal, according to another embodiment. The method 800 includes receiving an indicator of an available capacity of an output queue of a stage of a multi-stage switch, at 802. Such an indicator can be received by a flow control module associated with a module of the stage of the multi-stage switch.

A request for a data packet within the output queue is sent if the indicator of the available capacity of the output queue satisfies a condition, at 804. The module of the stage of the multi-stage switch can select a data packet to send to the flow control module. In some embodiments, the module of the stage of the multi-stage switch can select the data packet randomly, based on a time that the module of the stage of the multi-stage switch received the request, based on the last data packet stored in the queue, the data packet stored in the queue the longest, and/or using any other suitable method or algorithm.

The data packet is received from the stage of the multi-stage switch, at 806, and the data packet is parsed to identify an identifier of a source edge device of the data packet, at 808. Such an identifier can be included in a header portion of the data packet.

A flow control signal is sent to the source edge device of the data packet using a first flow control protocol such that the source edge device sends a flow control signal to a source peripheral processing device using a second flow control protocol, at 810. The first flow control protocol can be used within the multi-stage switch while the second flow control protocol can be used to send flow control signals to devices (e.g., peripheral processing devices) operatively coupled to the multi-stage switch. For example, the first flow control protocol can be used to send flow control signals between modules within a switch fabric and edge devices while the second flow control protocol can be used to send flow control signals between edge devices and peripheral processing devices. In some embodiments, the second flow control protocol can be a standard flow control protocol such as, for example, IEEE 802.3x Ethernet pause, IEEE 802.1Qbb priority pause, IEEE 802.1Qau QCN, QFC, and/or the like.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

While shown and described above as the flow control module monitoring an available capacity of an output queue, in other embodiments, the switch module (e.g., switch 320) monitors the available capacity of the output queue and automatically sends data packets to the flow control module when the available capacity of the output queue is less than a threshold. The flow control module can define and send flow control signals to edge devices based on the received data packets.

While shown and described above as sending a data packet from an output queue of a module within a switch fabric to a flow control module, in other embodiments, a copy of the data packet is sent to the flow control module. In such embodiments, the original data packet remains in the output queue to be sent via an output port and the copy of the data packet is used to define a flow control packet to be sent to a source edge device.

While shown and described above as being a three-stage switch fabric, in other embodiments, the switch fabric can include any number of stages. In some embodiments, for example, the switch fabric can be a five stage switch fabric similar to the switch fabric shown and described in co-pending U.S. patent application Ser. No. 12/345,500, filed on Dec. 29, 2008, and entitled System Architecture for a Scalable and Distributed Multi-Stage Switch Fabric," and co-pending U.S. patent application Ser. No. 12/345,502, filed on Dec. 29, 2008, and entitled "Methods and Apparatus Related to a Modular Switch Architecture," each of which is incorporated herein by reference in its entirety.

In some embodiments, the flow control systems and/or methods described herein can be used with an edge flow control loop, a priority flow control loop and/or a link flow control loop similar to the edge flow control loops, the priority flow control loops and the link flow control loops shown and described in co-pending U.S. patent application Ser. No. 12/242,224, filed on Sep. 30, 2008, entitled "Methods and Apparatus for Flow Control Associated with Multi-Staged Queues;" co-pending U.S. patent application Ser. No. 12/242,230, filed Sep. 30, 2008, entitled "Methods and Apparatus for Flow-Controllable Multi-Staged Queues;" and co-pending U.S. patent application Ser. No. 12/558,118, filed Sep. 11, 2009, entitled "Methods and Apparatus for Defining a Flow Control Signal Related to a Transmit Queue;" each of which is incorporated herein by reference in its entirety.

While shown and described above as routing, switching and/or forwarding a data packet through a switch fabric (e.g., switch fabric 200 of FIG. 2), in some embodiments edge devices are configured to partition data packets into one or more data cells. In such embodiments, the data cells include a header (e.g., with a destination edge device identifier and a source edge device identifier) and can be routed, switched and/or forwarded through a switch fabric similar to that described herein with respect to data packets. A destination edge device can receive and reassemble the data cells to define the data packet. The data packet can then be sent to a destination peripheral processing device. In some embodiments, such data cells do not take a common path through the switch fabric. For example, some data cells defined from a data packet might pass through a first module associated with a second stage of the switch fabric while other data cells defined from the same data packet might pass through a second module associated with the second stage of the switch fabric. Moreover, in some embodiments, the data cells are equal in length and/or size.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) configured to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software configured to perform computations on relatively heavy network workloads. In some embodiments, the services nodes can be configured to perform computations on a per packet basis in a relatively efficient fashion (e.g., more efficiently than can be performed at, for example, a compute node 110). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices configured to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a memory; and
a processor operatively coupled to the memory and configured to be operatively coupled to a multi-stage switch, the processor configured to:

receive an indicator of an available capacity of an output queue of a stage of the multi-stage switch, send a data packet sampling request to the multi-stage switch if the indicator of the available capacity of the output queue satisfies a condition, receive, in response to the data packet sampling request, a data packet from the stage of the multi-stage switch, determine, based on the data packet, an identifier of a source edge device of the data packet, the data packet originated from a source peripheral processing device and entered the multi-stage switch via the source edge device, and send a first flow control signal to the source edge device of the data packet using a first flow control protocol such that the source edge device sends a second flow control signal to the source peripheral processing device operatively coupled to the source edge device using a second flow control protocol, the first flow control signal being different from the second flow control signal, the first flow control protocol being different from the second flow control protocol.

2. The apparatus of claim 1, wherein:

the condition is a first condition, the indicator of the available capacity of the output queue satisfying the first condition when the available capacity of the output queue is less than a first threshold and greater than a second threshold, the processor is configured to receive a first plurality of data packets including the data packet at a first rate when the indicator of the available capacity of the output queue satisfies the first condition, the processor is configured to receive a second plurality of data packets excluding the data packet at a second rate when the available capacity of the output queue is less than the second threshold, the second rate being greater than the first rate.

3. The apparatus of claim 1, wherein the source peripheral processing device is configured to suspend data transmission to the source edge device, in response to receiving the second flow control signal from the source edge device.

4. The apparatus of claim 1, wherein the source edge device is configured to suspend data transmission to the multi-stage switch, in response to receiving the first flow control signal from the processor.

5. The apparatus of claim 1, wherein the processor is configured to send the first flow control signal to the source edge device via an out-of-band control plane connection.

6. The apparatus of claim 1, wherein the processor is configured to send the first flow control signal to the source edge within a data plane, via which the data packet is sent to the stage of the multi-stage switch.

7. The apparatus of claim 1, wherein:

the first flow control signal includes a severity identifier indicating a congestion level at the output queue of the stage of the multi-stage switch, and the processor is configured to send the first flow control signal such that the source edge device suspends data transmission to the multi-stage switch, based on the severity identifier in the first flow control signal.

8. The apparatus of claim 1, wherein the processor is configured to receive the data packet randomly from a plurality of data packets stored at the output queue of the stage of the multi-stage switch.

9. The apparatus of claim 1, wherein the processor is configured to receive the data packet that is received by the multi-stage switch substantially immediately after the processor sends the data packet sampling request to the multi-stage switch.

10. The apparatus of claim 1, wherein the processor is configured to receive the data packet that is stored at the output queue of the stage of the multi-stage switch.

11. The apparatus of claim 1, wherein the first flow control protocol is Ethernet pause, priority pause, quantized congestion notification, or quantum flow control.

12. A method, comprising:

receiving an indicator of an available capacity of an output queue of a multi-stage switch;

when the available capacity of the output queue is less than a first threshold and greater than a second threshold, receiving a first plurality of data packets from the multi-stage switch at a first rate;

when the available capacity of the output queue is less than the second threshold, receiving a second plurality of data packets from the multi-stage switch at a second rate greater than the first rate; and determining, based on a data packet from at least one of the first plurality of data packets or the second plurality of data packets, an identifier of a source edge device of the data packet, the data packet sent from a source processing device and entered the multi-stage switch via the source edge device;

sending, based on the identifier of the source edge device, a first flow control signal to the source edge device such that the source edge device sends a second flow control signal to the source processing device operatively coupled to the source edge device using a second flow control protocol, the first flow control signal being different from the second flow control signal, the first flow control protocol being different from the second flow control protocol.

13. The method of claim 12, wherein the multi-stage switch is a Clos network.

14. The method of claim 12, wherein the first flow control signal is sent via an out-of-band control plane connection.

15. The method of claim 12, wherein the first flow control signal is sent within a data plane, via which the first plurality of data packets or the second plurality of data packets is sent to the multi-stage switch.

16. The method of claim 12, wherein:

the first flow control signal includes a severity identifier indicating a congestion level at the output queue of the stage of the multi-stage switch, and the sending the first flow control signal to the source edge device includes sending the first flow control signal to the source edge device such that the source edge device suspends data transmission to the multi-stage switch, based on the severity identifier in the first flow control signal.

17. An apparatus, comprising:

a memory; and a processor operatively coupled to the memory, the processor is configured to:

send, from an edge device of a multi-stage switch and to an output queue of a stage of the multi-stage switch, a data packet originated from a source peripheral processing device, receive, from a flow control processor configured to be operatively coupled to the multi-stage switch, a first flow control signal including a first severity value when an available capacity of the output queue meets a first threshold, the first severity value indicating a first level of congestion at the output queue, receive, from the flow control processor, a second flow control signal including a second severity value when the available capacity of the output queue meets a second threshold, the second severity value indicating a second level of congestion at the output queue, the available capacity of the output queue being greater at the first threshold than at the second threshold, and send, from the edge device to the source peripheral processing device, a third flow control signal based on the first flow control signal or the second flow control signal such that the source peripheral processing device suspends data transmission to the edge device.

18. The apparatus of claim 17, wherein the processor is configured to:

receive the first flow control signal in a first flow control protocol, and send, to the source peripheral processing device, the third flow control signal in a second flow control protocol different from the first flow control protocol.

19. The apparatus of claim 17, wherein the processor is configured to receive the first flow control signal via an out-of-band control plane connection.

20. The apparatus of claim 17, wherein the multi-stage switch is a Clos network.

* * * * *